US00RE37691E

(19) United States
(12) Reissued Patent
Tanaka

(10) Patent Number: US RE37,691 E
(45) Date of Reissued Patent: May 7, 2002

(54) OUTPUT METHOD

(75) Inventor: Fumihiro Tanaka, Yono (JP)

(73) Assignee: Canon Kabushiki Kaisha, Tokyo (JP)

(21) Appl. No.: 08/870,365

(22) Filed: Jun. 6, 1997

Related U.S. Patent Documents

Reissue of:
(64) Patent No.: 5,422,985
Issued: Jun. 6, 1995
Appl. No.: 08/324,484
Filed: Oct. 18, 1994

U.S. Applications:

(63) Continuation of application No. 08/095,494, filed on Jul. 26, 1993, now abandoned, which is a continuation of application No. 07/755,498, filed on Aug. 30, 1991.

(30) Foreign Application Priority Data

Sep. 3, 1990 (JP) ..... 2-230599

(51) Int. Cl.[7] ..... G06K 15/00
(52) U.S. Cl. ..... 358/1.14; 358/1.1
(58) Field of Search ..... 395/101, 112, 395/113, 115, 116; 347/900; 400/50, 51, 52; 397/8, 9, 18, 19, 20

(56) References Cited

U.S. PATENT DOCUMENTS 4,571,069 A * 2/1986 Kimura et al. ..... 355/203
4,881,180 A 11/1989 Nishiyama ..... 395/113
5,018,081 A * 5/1991 Yamaguchi et al. ..... 395/113

FOREIGN PATENT DOCUMENTS

EP 0297567 1/1989 ..... 395/113

OTHER PUBLICATIONS

IBM Technical Disclosure Bulletin, vol. 30, No. 8, Jan. 1988.
Computer Design, vol. 27, No. 13, Jul. 1988, pp 26–30.

* cited by examiner

*Primary Examiner*—Arthur G. Evans
(74) *Attorney, Agent, or Firm*—Fitzpatrick, Cella, Harper & Scinto

(57) ABSTRACT

An output apparatus comprises: a producing circuit for receiving code data indicative of a pattern to be generated and for producing a pattern based on the code data; an interruption instructing circuit for instructing the interruption of the outputting process; and a retreating circuit for retreating the code data which had already been received before the interruption was instructed in the case where the interruption has been instructed by the interruption instructing circuit. The code data is expressed by a page describing language. The preceding code data is retreated by a different data format when the outputting process has been interrupted. The recording process which has been interrupted can be restarted from the interrupted state by returning the retreated data from the auxiliary memory.

28 Claims, 4 Drawing Sheets

OUTPUT METHOD

Matter enclosed in heavy brackets [ ] appears in the original patent but forms no part of this reissue specification; matter printed in italics indicates the additions made by reissue.

This application is a *reissue of U.S. Pat. No. 5,422,985, issued on Jun. 6, 1995 from application Ser. No. 324,484, which is a* continuation of application Ser. No. 08/095,494, filed Jul. 26, 1993, now abandoned, which is a continuation of application Ser. No. 07/755,498, filed Aug. 30, 1991.

BACKGROUND OF THE INVENTION

1. Field of the Invention

The invention relates to an output method for producing and generating a pattern on the basis of data which has been supplied from the outside and which should be generated.

2. Related Background Art

In the kind of conventional output apparatus such as a printing apparatus with a laser beam printer or the like, when the processing of print data has once been started, the processing for first print data is continued until it is finished or the data is resigned (for instance, by resetting the printer or the like).

Therefore, there is a drawback in the case where there is a request for a new process to obtain simple printed matter during the execution of processes which require a long time due to a large amount of print data. Specifically the process which was currently being executed must be resigned during the execution of the new process, or the execution of the new process must be stayed until the end of the current process.

SUMMARY OF THE INVENTION

The invention is made in consideration of the above conventional technique and it is an object of the invention to provide an image recording apparatus in which during execution of a special recording process, another recording process can be realized.

In consideration of the above drawback, another object of the invention is to provide an image recording apparatus for receiving recording data, for producing an image pattern based on the recording data, and for recording an image onto a recording medium, comprising: interruption instructing means for instructing the interruption of a recording process; a retreating means for storing in recoverable format all of the data regarding the image recording before the interruption was instructed in deference to next image recording data when the interruption has been instructed by the interruption instructing means; and cancelling means for cancelling the interruption instructing means, wherein when the cancellation has been instructed by the cancelling means, the data retreated by the retreating means is returned and the image recording is restarted.

In consideration of the above drawbacks, another object of the invention is to provide an output method whereby print data which is expressed by a page describing language which is received can be temporarily stored in recoverable format and, after completion of another printing process, the print data is returned and the printing process can be executed.

In consideration of the above drawbacks, another object of the invention is to provide an output method whereby code data which is received can be stored in a format different from that of the code data.

In consideration of the above drawbacks, another object of the invention is to provide an output method whereby after completion of a printing process regarding a certain job, a printing process regarding stored data is automatically restarted.

DETAILED DESCRIPTION OF THE PREFERRED EMBODIMENTS

An embodiment according to the invention will be described in detail hereinbelow in accordance with the drawings.

In a printing apparatus in accordance with the present invention, a first job on certain print data is temporarily interrupted by a job interrupting switch during execution of a process on the print data, other print data is processed, and thereafter the interrupted job can be restarted. The term "job" as used in the specification denotes all of the processes from the start of processing the print data to the end thereof.

Figure 1:
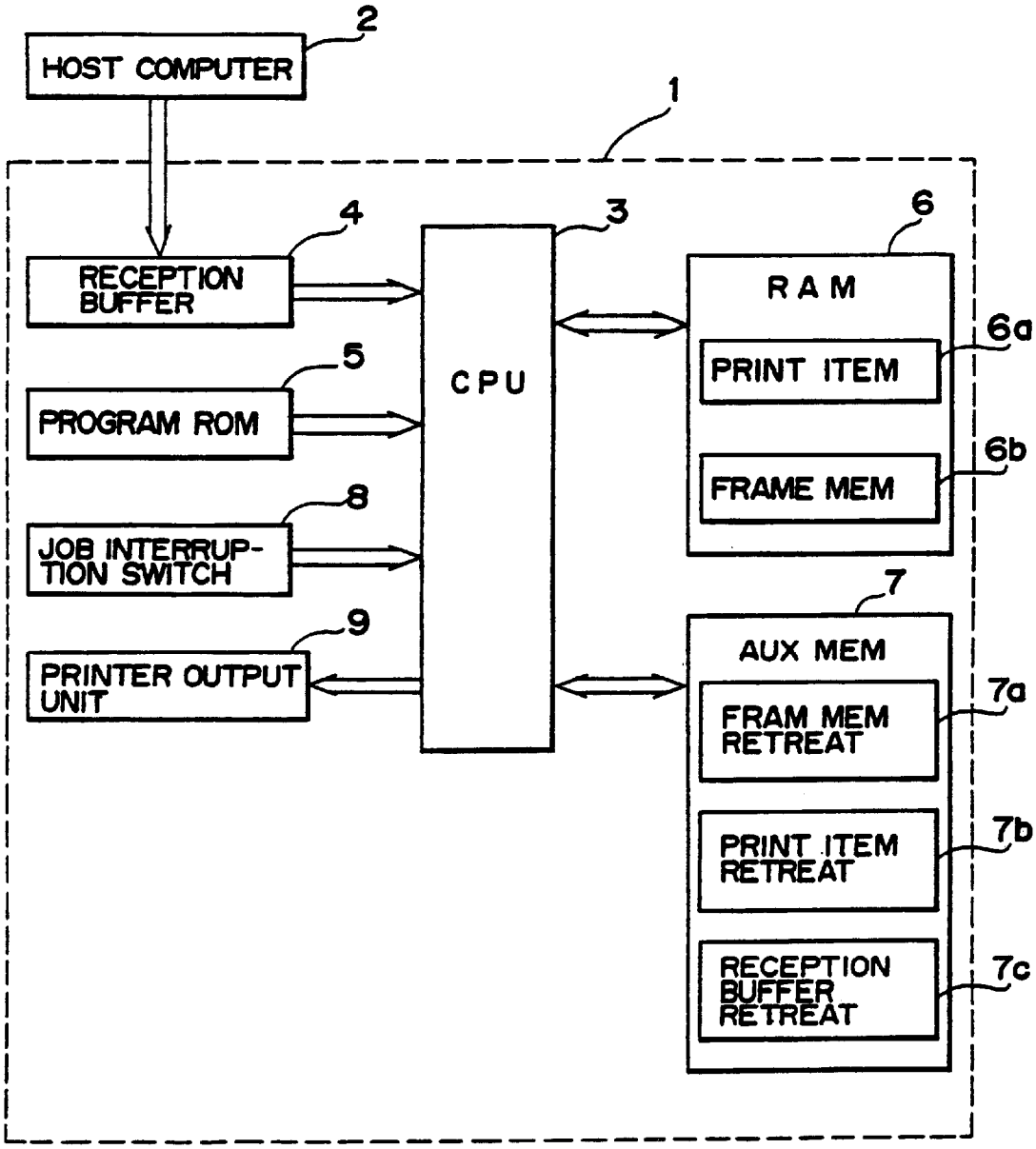
FIG. 1 is a block constructional diagram of a printing apparatus according to an embodiment.

FIG. 1 shows a block constructional diagram of the printing apparatus of the preferred embodiment.

In the diagram, reference numeral 1 denotes a printer main body of the embodiment; 2 a host computer to supply print data (for instance, data which is expressed by a page describing language or the like) in command format to the printer 1; 3 a CPU to control the whole printing apparatus; 4 a reception buffer to temporarily store the print data in the command format which was transmitted from the host computer 2; 5 a program ROM in which an operation processing procedure (a program such illustrated by the flowchart of FIG. 2 and the like) which is executed by the CPU 3 has been stored; and 6 a RAM which is used as a work area by the CPU 3 during operation. The RAM 6 has therein a print item area 6a and a frame memory 6b. Various kinds of set values (hereinafter referred to as "print items") which are always used to produce a print pattern, such as font name and character size selected, position on a sheet which is at present being printed and the like, are held in the area 6a. Print patterns of at least one page which have been developed are held in the frame memory 6b. Reference numeral 7 denotes an auxiliary memory such as a hard disk device or the like. The auxiliary memory 7 has therein: a frame memory retreat area 7a for retreating, i.e. temporarily storing, data necessary to restart the interrupted job, namely, the content in the frame memory 6b upon interruption of the job; a reception buffer retreat area 7c for retreating, i.e. temporarily storing, the content in the reception buffer 4; and a print item retreat area 7b for retreating, i.e. temporarily storing, the content in the print item area 6a. Reference numeral 8 denotes a job interruption switch. When the user turns on the switch 8, the job which is being processed is interrupted and a process for other print data can be executed. An on/off state of the switch 8 is checked by the CPU 3. Reference numeral 9 denotes a printer output unit to print the print patterns which have been stored and developed in the frame memory 6b.

Although the content in the frame memory 6b can be directly stored into the frame memory retreat area 7a, it is also possible to execute an arbitrary one of various kinds of data compression techniques such as run-length coding, JPEG, and the like to the content in the frame memory 6b and to store the compressed data into the frame memory retreat area 7a. In the case of retrieving and restoring the compressed content of the frame memory 6b from the retreat area 7a, an expanding circuit (not shown) is used.

Figure 2:
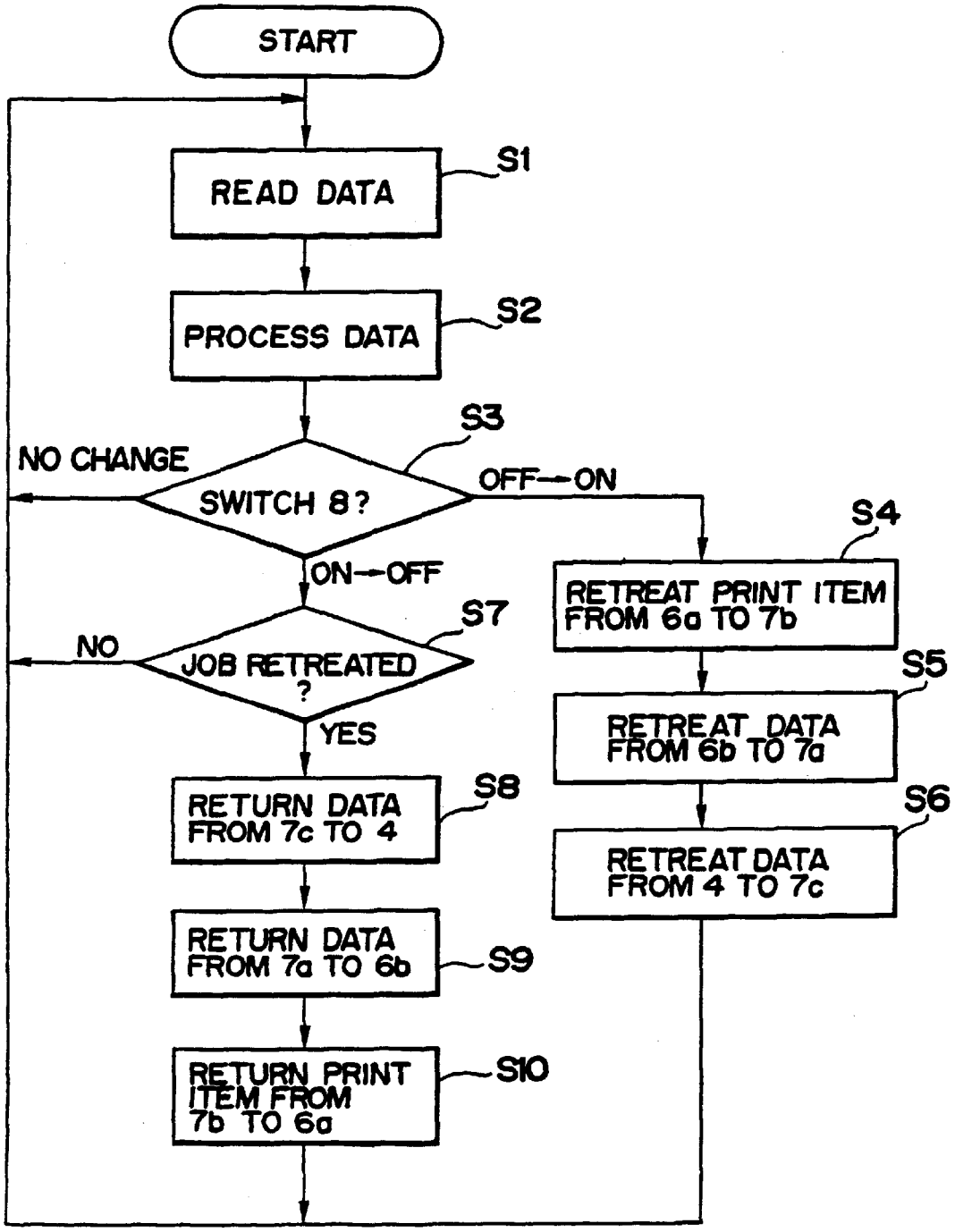
FIG. 2 is a flowchart of the embodiment.

A processing procedure in the embodiment with the above construction will now be described in accordance with the flowchart shown in FIG. 2.

In the embodiment, it is assumed that first a data receiving process from the host computer 2 and a storing process into the reception buffer 4 are executed by an interruption (not shown).

Then, in step S1, print data of one unit (including one command for the printing apparatus and parameters associated with the command) is read from the reception buffer 4. The print data is processed in step S2. A process to write the print data into the frame memory 6b or a process to set the print items for printing or the like is executed on the basis of the read data. In step S3, the preceding state (stored in a proper address in the RAM 6) of the job interruption switch 8 is compared with the present state, thereby discriminating whether the switch 8 has newly been set to the on-state or not (i.e. whether the switch 8 has been changed from the off-state to the on-state or not).

If it decides that the switch 8 has newly been set to the on-state, the processing routine advances from step S3 to step S4 to interrupt the job which is being executed. In step S4, the content in the print item area 6a upon interruption of the job is retreated (stored) into the print item retreat area 7b in the auxiliary memory 7. In the next step S5, the content in the frame memory 6b upon interruption of the job is retreated (stored) into the frame memory retreat area 7a in a manner similar to step S4. In step S6, the content in the reception buffer 4 upon interruption of the job is also retreated (stored) into the reception buffer retreat area 7c in the auxiliary memory 7. After completion of the execution of the above retreating processes, the reception buffer 4 and the areas 6a and 6b are initialized so that another job can be processed. After that, the processing routine returns to step S1 and the processes of a new job are executed.

On the other hand, if it determines in step S3 that the state of the job interruption switch 8 is unchanged, the processing routine returns to step S1 and the present process is continued.

If it decides in step S3 that the switch 8 has been changed from the on-state to the off-state, the processing routine advances to step S7 to restart any job which was retreated into the auxiliary memory 7, and first a check is made to see if a retreated job exists or not. If there is no retreated job, the processing routine returns to step S1 and the present process is continued. If a retreated job exists, step S8 follows and the content stored in the reception buffer retreat area 7c in the auxiliary memory 7 is returned to the reception buffer 4. In the next step S9, the content stored in the frame memory retreat area 7a in the auxiliary memory 7 is returned to the frame memory 6b in the RAM 6 and the state of the frame memory upon interruption of the job is returned. Further, the print items are similarly returned in step S10. After the states similar to those existing upon interruption of the job are reproduced in the above steps S8 to S10, the processing routine returns to step S1 and the execution of the interrupted job is restarted.

When the job interruption switch 8 is changed from the on-state to the off-state, if another job is being processed at that time, that other job is retreated to the auxiliary memory 7 and a job which had previously been retreated is returned.

As described above, according to the embodiment, during the execution of a printing process, for example for a large amount of print data which needs a long processing time, other print data can be processed and the efficiency of printing is raised. In the above case, moreover, the interrupted job is not processed from the beginning, but rather it is restarted from the state existing at that occurrence of the interruption, so that the interrupted job is efficiently performed.

Although the data of the interrupted job is held in the auxiliary memory in the embodiment, it can be also stored in a space area in the main memory.

Figure 3:
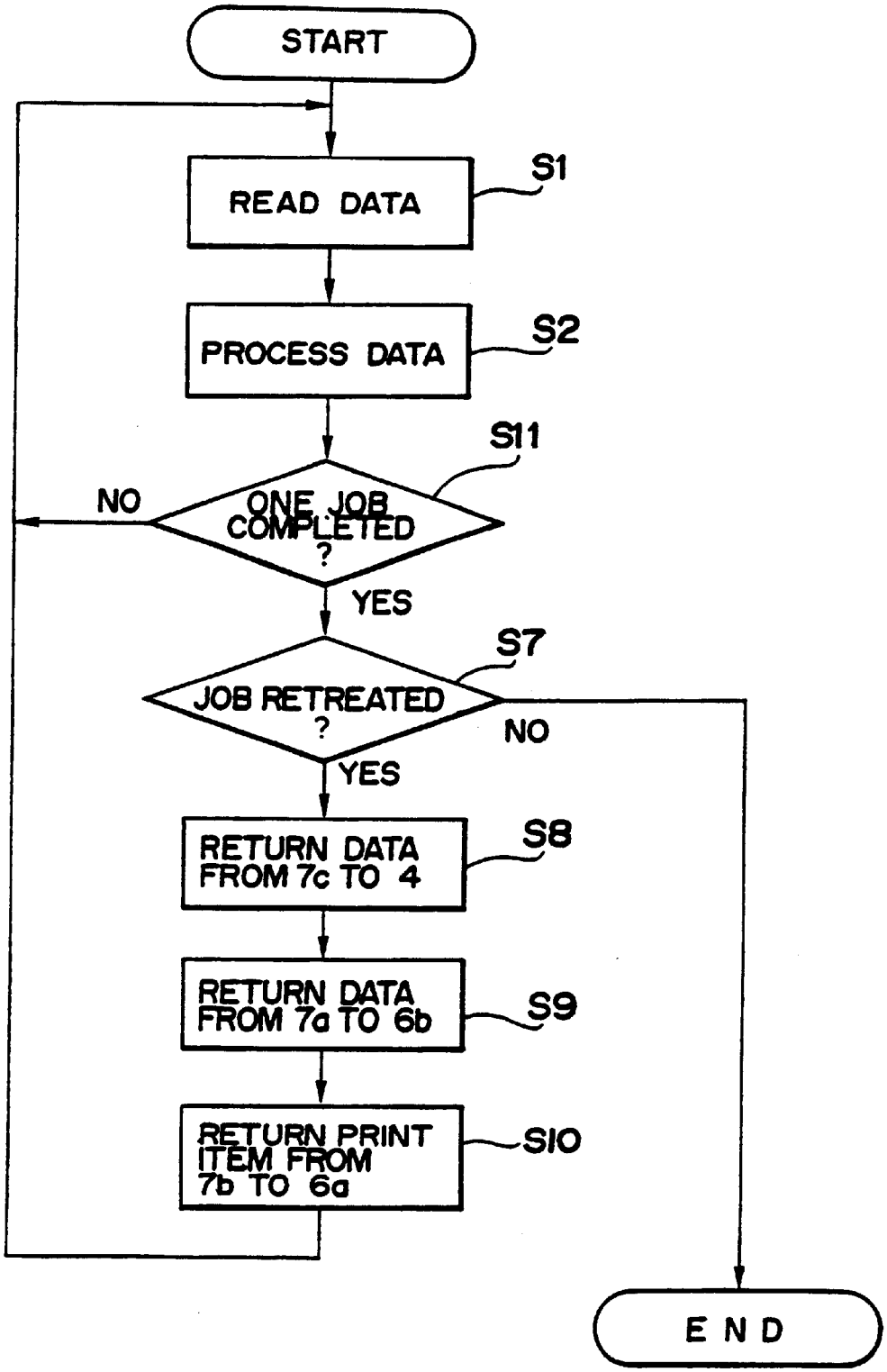
FIG. 3 is a flowchart of the embodiment.

Further, in the case where new print data is not received from the outside upon completion of the processes of one job, a job which [has] *had* been previously retreated can be automatically restarted, as indicated in FIG. 3 (see below).

In the embodiment, when the job interruption switch 8 had been changed from the off-state to the on-state, all of the data needed to restart the process at that point is immediately retreated to the auxiliary memory 7. However, if the reception of all of the data regarding the relevant job had not been completed at that time, the retreating process can be also performed after waiting for the completion of the reception.

In the case of the embodiment, the print data which expresses the job to be retreated is in a page describing language. However, it is also possible to analyze the print data during the retreating steps and to produce bit map data of one page. Further, the print data can be also compressed and stored by using the foregoing compressing method. Thus, the memory capacity required for storage can be reduced. That is in the case of retreating, the print data is stored in a different data format.

[Description of laser beam printer (FIG. 4)]

The construction of a laser beam printer in accordance with the present invention will now be described with reference to FIG. 4.

Figure 4:
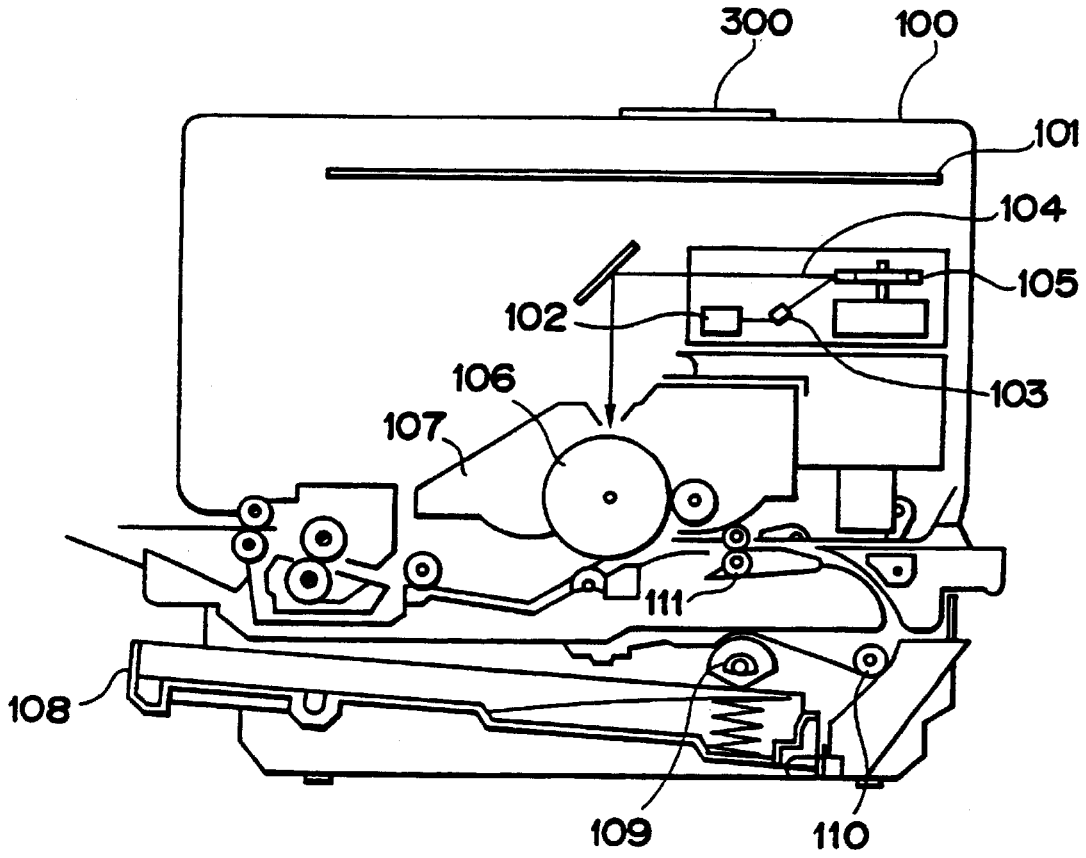
FIG. 4 is a diagram showing a structure of the printing apparatus.

FIG. 4 is a cross sectional view showing an internal structure of the laser beam printer (hereinafter abbreviated as LBP) of the embodiment. The LBP can register character patterns from a data source (not shown) and can register form data and the like.

In the diagram, reference numeral 100 denotes an LBP main body for receiving and storing character data (character codes), form data, macro commands, etc. which are supplied from the host computer (2 in FIG. 1) connected from the outside and for forming the corresponding character pattern, form pattern, etc. in accordance with those data, thereby forming an image onto a recording sheet used as a recording medium. Reference numeral 300 denotes an operation panel in which switches for operation, an LED display, and the like are arranged. Reference numeral 101 denotes a printer control unit for controlling the whole LBP 100 and for analyzing the character data and the like which are supplied from the host computer. The printer control unit 101 converts the character data into a video signal of the corresponding character pattern and supplies it to a laser driver 102.

The laser driver 102 is a circuit to drive a semiconductor laser 103 and switches on and off a laser beam 104 which is emitted from the semiconductor laser 103 in accordance with the input video signal. The laser beam 104 is oscillated to the right and left by a rotary polygon mirror 105 and scans on an electrostatic drum 106. Thus, an electrostatic latent image of the character pattern is formed on the drum 106. The latent image is developed by a developing unit 107 arranged around the drum 106 and, thereafter, it is copy transferred onto a recording sheet. A cut sheet is used as a recording sheet. The cut recording sheets are enclosed in a sheet cassette 108 attached to the LBP main body 100 and are fed one by one from the cassette 108 into the apparatus by a feed roller 109 and conveying rollers 110 and 111. The cut sheet is conveyed to the drum 106.

FIG. 3 is a control flowchart in the case of automatically restarting a retreated job after completion of one job. Steps S1, S2, S7, S8, S9, and S10 are the same as those in FIG. 2. A check is made in step S11 to see if the process of one job has been finished or not. If YES, step S7 follows and a check is made to see if a retreated job exists or not. If NO in step S7, the first printing process is finished. If YES in step S7, the processing routine advances to step S8 and subsequent steps and the retreated job is automatically returned and its process is restarted.

As described above, according to the invention, even during the execution of a certain recording process, another recording process can be executed. In such a case, moreover, the recording process which has been interrupted by the interrupting process can be restarted from the interrupted state.

What is claimed is:

1. An output apparatus comprising:

receiving means for receiving a plurality of pieces of command information relating to a first job for a first image;

first memory means for storing the received command information;

generating means for generating dot data based on the command information stored in said first memory means;

second memory means for storing the generated dot data; and retreating means for retreating both the received command information stored in said first memory means and the dot data stored in said second memory means to a third memory means in response to an output processing for the first job being interrupted to perform an output processing for another job for a different image.

2. An output apparatus according to claim 1, wherein said retreating means comprises means for compressing the dot data generated by said generating means and for storing the compressed dot data in response to the output processing for the first job being interrupted.

3. An output apparatus according to claim 2, further comprising means for returning the stored compressed dot data to its original form.

4. An output apparatus according to claim 1, further comprising instructing means for instructing the interruption of the output processing, wherein said retreating means retreats the received information after the command information relating to the first job has been completely received by said receiving means.

5. An output apparatus according to claim 4, wherein said instructing means instructs the interruption so as to output other dot data relating to the other job.

6. An output apparatus according to claim 1, further comprising means for generating size information and position information for a pattern to be output by said apparatus based on the received command information, wherein said retreating means further retreats the size and position information when the output processing for the first job is interrupted.

7. An output apparatus according to claim 6, further comprising means for outputting the dot data.

8. An output apparatus according to claim 1, further comprising analyzing means for analyzing the received command information while the command information is retreated by said retreating means.

9. An output apparatus according to claim 1, wherein the command information is represented by page description language.

10. An output apparatus according to claim 1, further comprising means for outputting the dot data.

11. An output apparatus according to claim 1, wherein said retreating means retreats at least one piece of the command information based on which dot data has not yet been generated by said generating means.

12. An output apparatus according to claim 1, further comprising the third memory means for storing the command information and the dot data retreated by said retreating means.

13. An output apparatus according to claim 12, wherein said third memory means comprises a hard disc.

14. An output apparatus according to claim 10, wherein said outputting means comprises means for printing the dot data on a recording medium as an image.

15. An output apparatus according to claim 14, wherein said printing means prints the dot data by an electrostatic recording method.

*16. An output method comprising the steps of:*

*receiving a plurality of pieces of command information relating to a first job;*

*generating dot data based on the received command information and storing the generated dot data; and*

*re-treating both the received command information and the stored dot data in response to an interruption during said generating step for the first job so as to perform an output processing for another job.*

*17. An output method according to claim 16, wherein said re-treating step comprises compressing the dot data generated in said generating step and storing the compressed dot data in response to the interruption.*

*18. An output method according to claim 17, further comprising the step of returning the stored compressed dot data to its original form.*

*19. An output method according to claim 16, further comprising the step of instructing the interruption, and wherein, in said re-treating step, the received information is re-treated after the command information relating to the first job has been completely received.*

*20. An output method according to claim 19, wherein said instructing step includes instructing the interruption so as to output other dot data relating to the other job.*

*21. An output method according to claim 16, further comprising the step of generating size information and position information for a pattern to be output based on the received command information, wherein, in said re-treating step, the size and position information is re-treated.*

*22. An output method according to claim 16, further comprising the step of analyzing the received command information while the command information is re-treated in said re-treating step.*

*23. An output method according to claim 16, wherein the command information is represented by page description language.*

*24. An output method according to claim 16, wherein, in said re-treating step, any command information based on which dot data has not yet been generated in said generating step is re-treated.*

*25. An output method according to claim 16, wherein the command information and the dot data re-treated in said re-treating step are stored in memory means.*

*26. An output method according to claim 25, wherein the memory means comprises a hard disc.*

*27. An output method according to claim 16, further comprising the step of printing the dot data on a recording medium as an image.*

*28. An output method according to claim 27, wherein, in said printing step, the dot data is printed using an electrostatic recording method.*

* * * * *

UNITED STATES PATENT AND TRADEMARK OFFICE

CERTIFICATE OF CORRECTION

PATENT NO. : RE 37,691 E
DATED : May 7, 2002
INVENTOR(S) : Fumihiro Tanaka

It is certified that error appears in the above-identified patent and that said Letters Patent is hereby corrected as shown below:

Column 2,
Line 36, “such” should read -- such as --.

Column 4,
Line 27, “is in” should read -- is, in --.
Line 33, “cross sectional” should read -- cross-sectional --.

Column 6,
Line 6, “the third” should read -- third --.

Signed and Sealed this

Eighth Day of October, 2002

*Attest:*

*Attesting Officer*

JAMES E. ROGAN
*Director of the United States Patent and Trademark Office*